Sept. 19, 1961 P. M. STIGLIC 3,000,181
TURBINE ENGINE ACCELERATION CONTROL APPARATUS
Filed July 5, 1957 2 Sheets-Sheet 1
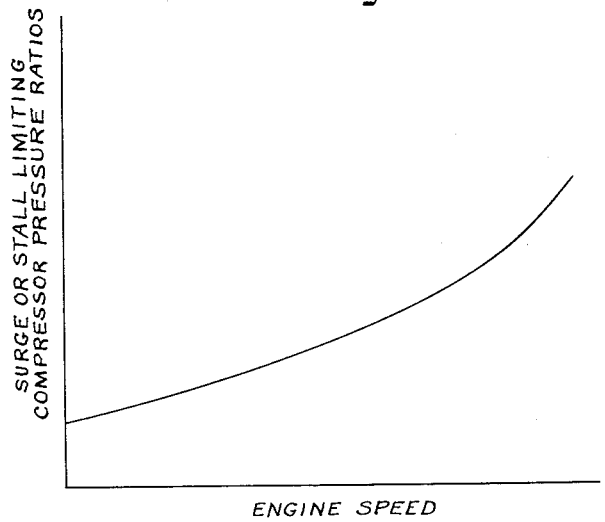
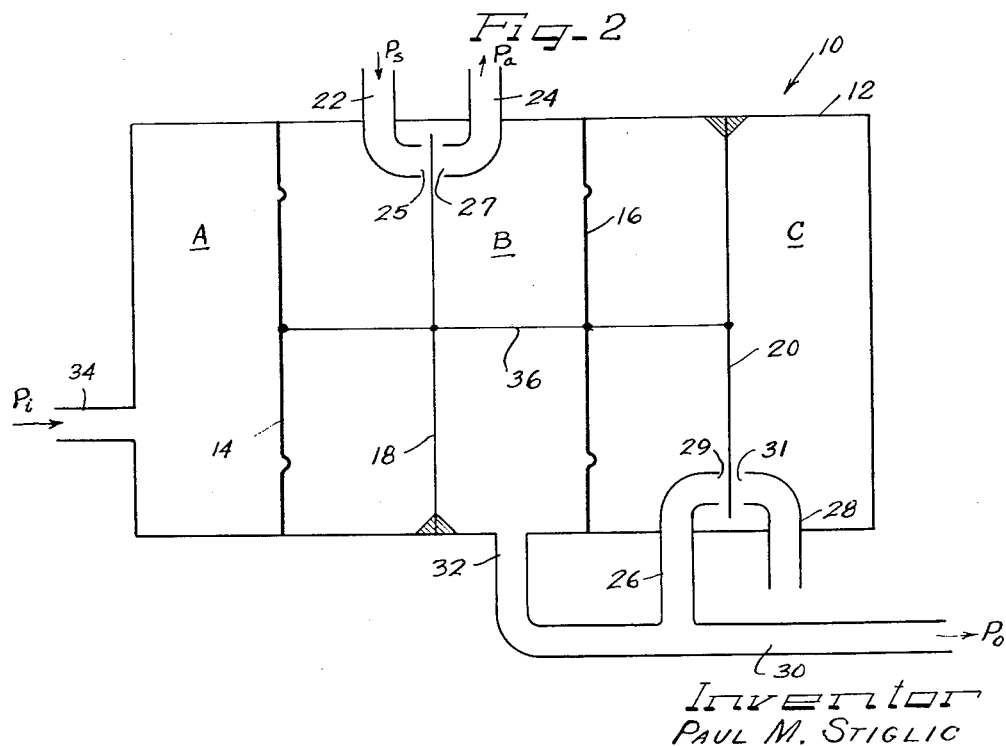
Inventor
PAUL M. STIGLIC

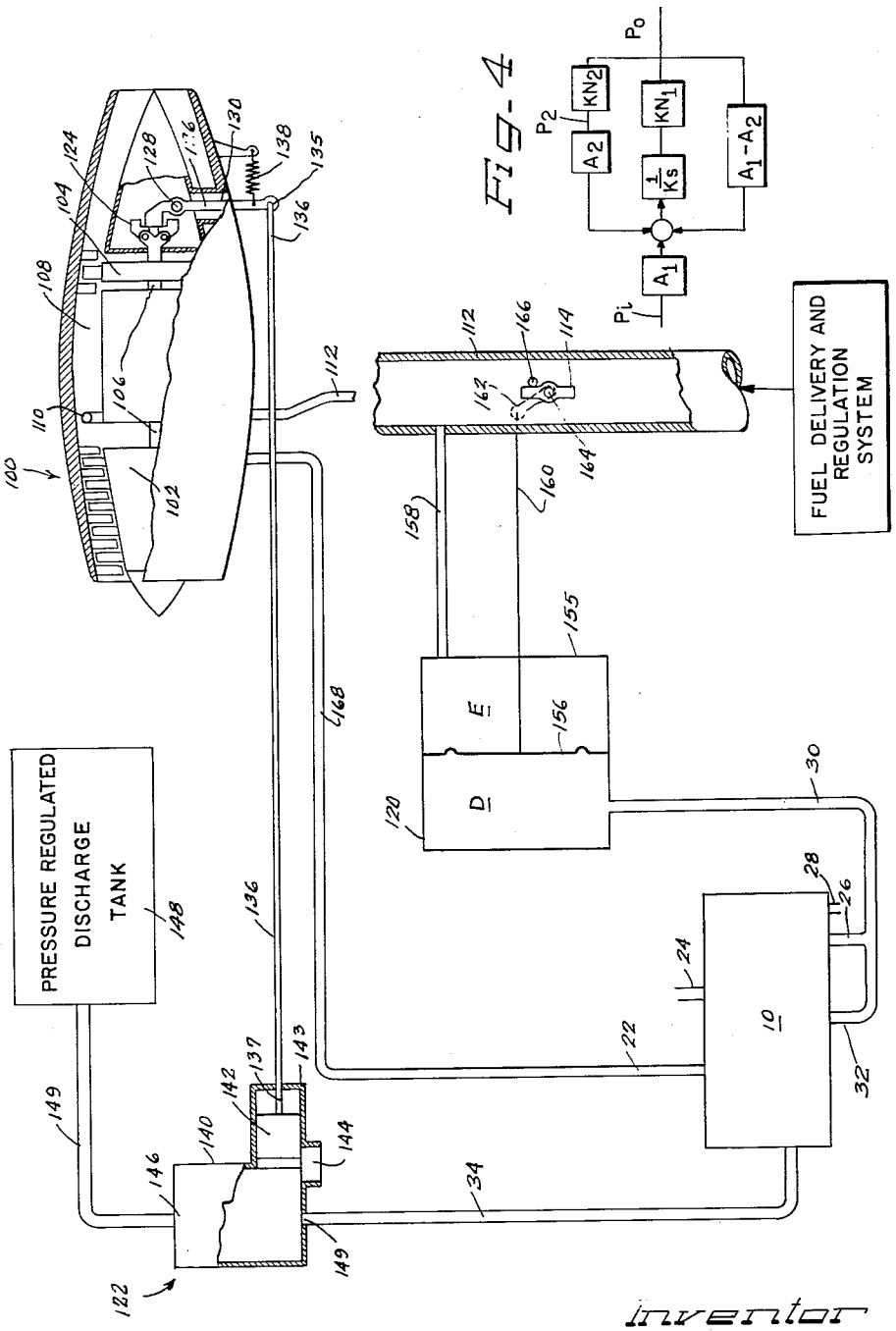

3,000,181
TURBINE ENGINE ACCELERATION CONTROL APPARATUS
Paul M. Stiglic, Wickliffe, Ohio, assignor to Thompson Ramo Wooldridge Inc., a corporation of Ohio
Filed July 5, 1957, Ser. No. 669,983
2 Claims. (Cl. 60—39.28)

The present invention relates to improvements in an acceleration control apparatus for a turbo-jet engine, and more particularly to an acceleration control apparatus for limiting the rate of increase in fuel flow for each engine speed.

Modern gas turbine reaction engines, commonly referred to as turbo-jets, deliver high power per unit weight because of their high engine speeds. These engines require a high delivery rate of compressed air and a high exhaust rate of combustion products. During constant engine speed, the air flow through the compressor is more or less directly related to the fuel flow. When the pilot or operator, however, makes a change in throttle setting to accelerate the engine, the inertia of the rotor assembly consisting of one or more compressors with the attached turbine, will resist the increase in speed, and in fact, the higher schedule of fuel flow may even temporarily cause a decrease in air flow through the compressor. This occurs because when the rotor is attempting to accelerate, the inertia and elasticity of the air causes the increase in air flow to lag the increase in rotor speed. This produces mismatching of the air flow in the engine with the blade angles of the compressor, and results in a separation of the air flow. This condition is known as surging when it happens to centrifugal flow air compressors, and is called stall when it happens to axial flow compressors. In either case, it could cause a flame-out which would be difficult to correct in flight, and which is most likely to occur during an emergency, when maximum acceleration of the engine may be required.

The invention described herein automatically limits the fuel flow to a turbo-jet engine during acceleration to prevent the surging or stalling conditions described above, and permits the pilot to call for the maximum acceleration required, with the knowledge that the control system will automatically limit the acceleration to avoid these dangerous conditions at each engine speed.

Thus it is a primary object of this invention to provide a novel fuel control system for use with gas turbine reaction engines for limiting the rate of increase of fuel flow during acceleration, to prevent surging or stalling.

Another object of the invention is the provision of a fuel control system for a turbo-jet engine which automatically restricts the rate of acceleration of the engine to safe values for each engine speed.

Yet another object of this invention is to provide an automatic fuel feeding override system for use in a reaction engine which functions only when the fuel delivery rate increase exceeds the maximum permissible value.

These and other objects of this invention will appear from the following description of the invention with reference to the accompanying drawings in which:

FIGURE 1 is a curve representing the stall or surge compressor limits as a function of the engine speed characteristic of a particular engine.

FIGURE 2 is a diagrammatic sectional view of the pneumatic function generator.

FIGURE 3 is a schematic illustration of the acceleration control system embodying the pneumatic function generator of FIGURE 2.

FIGURE 4 is a block diagram of the function generator.

As shown in the drawings:

Referring now to FIGURE 2 of the drawings, a pneumatic function generator, comprises a sealed casing 12, which in the example shown, is box-shaped. The casing is divided into chambers A, B, and C, by a pair of flexible diaphragms 14 and 16. Chambers B and C are each provided with valve closures, which, as illustrated, take the form of flapper elements 18 and 20. These elements are oppositely disposed in spaced parallel relationship and each comprises a thin, elongated plate, which may be made of metal or some other resilient material. These elements are connected to opposite walls of the casing 12 as by soldering or other conventional methods, and are capable of resiliently bending within limtis as hereinafter described.

A pair of conduits 22 and 24 extend into the casing. Conduit 22 is supplied with air at some constant pressure $P_s$ and conduit 24 communicates with the ambient air to provide an exhaust for the casing at some pressure $P_a$. The portions of the conduits inside the casing are bent to project toward each other. These portions terminate in orifices 25 and 27 which are oppositely disposed in closely spaced facing relation. The position of flapper element 18 between the orifices 25 and 27 regulates the air flow in and out of the casing. In a like manner, flapper element 20, cooperates with orifices 29 and 31 on the similarly positioned inlet and outlet conduits 26 and 28. As seen, conduit 26 is the feedback from the outlet conduit 30 which extends from a port 32 in a side wall of chamber B. Input or control air at a pressure $P_i$ enters chamber A of the function generator through a conduit 34. A control rod 36 rigidly connects diaphragms 14 and 16 with both of the flapper elements 18 and 20, bending them and requiring them to move in unison. The spacing between the orifices, the effective areas of the diaphragms, and the inlet pressure $P_s$ may be adjusted so the output pressure $P_o$ and the control pressure $P_i$ may have any desired functional relationship. This suggests that if $P_i$ is proportional to the engine speed, the variables in the function generator may be adjusted so $P_o$ corresponds to the surge or stall pressure limits set forth in FIGURE 1.

The manner in which nozzle spacing effects output pressure can be more clearly understood by reference to a block diagram of the function generator 10 of the present invention. Such a block diagram appears as FIGURE 4 of the drawings, and in this particular view $A_1$ is the area of the diaphragm 14, $A_2$ is the area of the diaphragm 16, $K_{N1}$ is the gain of the flapper nozzle 25—27 in p.s.i./in., $K_{N2}$ is the gain of the feed back nozzles 29—31 in p.s.i./p.s.i., and $K_S$ is the spring rate of the closed system.

As in any closed loop system, the closed loop gain is determined almost completely by the gain of the feedback path. In the function generator there are two feedback paths, $A_2K_{N2}$ and $(A_1-A_2)$. If either of these are varied, the gain of the system will change. The gain of the feedback nozzle $K_{N2}$ is shown below.

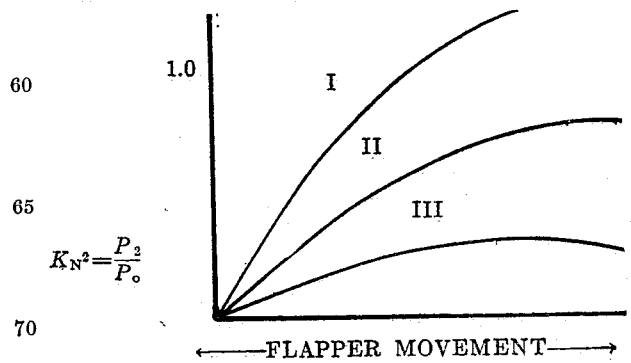

←——FLAPPER MOVEMENT——→

Nozzle size and spacing alone determine if the gain is I, II or III. Since the flapper moves when input pressure $P_i$ is changed, the feedback gain also changes and thus changes the closed loop gain of the function generator continuously throughout the range of operation. This change in gain gives the ever increasing or ever decreasing slope characteristic to the unit and different curves, such as the stall line, can be matched by different nozzle settings.

The relative diaphragm areas also affect the gain of the function generator but once set, they of course remain fixed. The steepness of the curve it is desired to generate will determine the areas which can be used to the greatest advantage. Supply pressure can be varied to shift the entire curve up or down but will not alter its shape. In general then the function generator is able to generate a curved characteristic because the slope of the $P_i$ vs $P_o$ plot which is the gain of the device is changing in a prescribed manner throughout the operating range.

It is thus to be seen that the function generator can be used to duplicate any curve that has an "ever increasing" slope, or an "ever decreasing" slope. The turbo-jet stall limit plotted against engine speed is the former type. Further, as is pointed out below output pressure is functionally related to input pressure not only by the engine limit characteristics of FIGURE 1, but by limiting fuel flow through the conduit 158 to the comparator 120. Accordingly, the chamber D pressure in the comparator is also the same as the output pressure.

The control system disclosed in FIGURE 3 utilizes the function generator described above, for limiting the acceleration rate of a turbo-jet engine. As seen, engine 100 is provided with an air compressor 102, a turbine 104, a rotor shaft 106 connected between them, and a combustion chamber 108 as is understood in the art. The combustion chamber 108 includes an annular fuel feeding manifold 110 with the usual fuel delivery orifices therein. A fuel line 112 delivers the fuel to the engine 100 from the fuel tanks (not shown). The acceleration limiting throttle valve 114 within fuel line 112 limits the fuel delivery rate in a manner to be described below. It should be understood that the engine 100 is provided with the usual fuel delivery and regulation system (not shown) for delivering fuel to the fuel line and to the engine at a pressure equal to or proportional to the pressure produced by the engine air compressor, and that the action of valve 114 overrides the normal control to restrict the fuel flow, only when the rate of increase in fuel tends to cause the compressor pressure to exceed the permissible value for each engine speed, as shown in the curve of FIGURE 1 and described in connection therewith.

The apparatus for controlling the operation of valve 114 in accordance with the principles hereinabove described consists in the combination of a pneumatic function generator 10, a comparator 120, and a pneumatic speed converter 122 for converting the engine speed to an air pressure proportional to the engine speed. A conventional structure 124 responsive to the centrifugal force exerted by the rotor shaft 106 is connected to the rotor shaft and to one end of a lever 126 which is pivoted at 128. The other end of this lever extends through the engine housing and is pivotally connected at 134 to end 135 of a slidable link 136. The other end 137 of link 136 is connected to a piston type valve 142 inside the housing of the pneumatic speed converter 122. A spring 138 connected to end 135 of the link 136 biases the connected lever 126 into continuous coaction with the structure 124, in a manner well known in the art, so that the speed of the engine is reflected in the movement of the lever 126 and the connected link 136.

The pneumatic speed converter has a housing 140. A pressure regulated discharge tank 148, fed for example by the engine air compressor, delivers a source of air at a constant pressure to the speed converter by means of a conduit 149. This conduit terminates in the inlet port 146 in the speed converter. The piston type valve 142 slides in a cylinder 143 in the housing 140 and regulates the opening of the discharge port 144. The conduit 34 is connected to the housing 140 by means of the outlet port 149. With this arrangement, there is a continuous air flow to the housing 140 fed by the pressure regulated tank, and a continuous discharge of air through the discharge port 144. This results in the pressure in the housing being stabilized at some value between the delivery pressure of the source 148 and the ambient air pressure. Since, as stated above, the position of link 136 and the piston valve 42 is reflective of the speed of the engine, the regulation of the size of the discharge port 144 will also be dependent upon the engine speed. Therefore, the pressure in the housing can be made proportional to the engine speed if the valve 142 and valve port 144 are properly shaped by means well known in the art.

The other end of the conduit 34 opens into the closed chamber A in the interior of unit 10, so the pressure $P_i$ in that chamber is also reflective of the engine speed, see FIGURE 2. The function generator 10 is fed by the conduit 22 which is connected at one end to the air compressor of the engine, as shown. If desired, a suitable pressure regulating system of a type well known in the art could be connected in conduit 22 to deliver air at a constant pressure to the function generator. The output pressure $P_o$ of generator 10 is connected to the sealed casing 155 of the comparator 120 by means of conduits 30, 32 and 26. The interior of the comparator 120 is divided into a pair of chambers D and E by a flexible diaphragm 156. Chamber D is provided with the pressure $P_o$ and chamber E is provided with the fuel delivery pressure in conduit 112 by means of the connecting conduit 158.

An actuating rod 160 is attached at one end to the center of diaphragm 156 and at the other end to a pivotal link 162 mounted behind the fuel conduit 112. The opposite end of this pivotal link is connected to the shaft 164 which extends inside the fuel conduit and which is rigidly connected to the valve member 114. With this arrangement, valve 114, shaft 164, and link 162, are connected together for common rotation. Therefore, movement of the diaphragm controls the rotation of valve 114. A stop 166 is mounted in the conduit 112 and limits the clockwise movement of the valve member 114 to its maximum open position, as illustrated.

The operation of the comparator and valve member 114 is as follows: When the pressure in chamber E of the comparator 120 exceeds the pressure in chamber D, the diaphragm 156 is forced into chamber D. This movement rotates valve member 114 in a counter-clockwise direction, to throttle the flow of fuel in conduit 112, and slows down the engine. This in turn decreases the pressure in chamber E until the valve 114 is restored to its original position. It is apparent, however, that as long as the pressure in chamber D exceeds or equals the fuel delivery pressure, valve 114 will remain in full open position because of stop 166.

The control system shown in FIGURE 3 operates as follows: Suppose, while the engine is operating at some steady speed, the operator makes a throttle adjustment to accelerate the engine which calls for an increase in the fuel delivery rate exceeding the prescribed limits. Since as stated above, the input pressure $P_i$ to the function generator 10 is proportional to the engine speed, and the output pressure $P_o$ is functionally related to $P_i$ in accordance with the engine limit characteristics as disclosed in FIGURE 1 or with reference to limiting fuel flow as shown in FIGURE 3, the pressure in chamber D of the comparator will also be $P_o$.

Since the chamber E is under the same pressure existing in conduit 112, it is provided with information concerning actual fuel flow and if this pressure exceeds the limiting pressure $P_o$, diaphragm 156 in the comparator 120 will be forced into the chamber D. Thus, the comparator 120 compares actual engine fuel flow (chamber E) with limiting fuel flow (chamber D) and takes appropriate action when pressure in E exceeds pressure in D. This movement rotates valve element 114 decreasing the actual fuel delivery pressure to the engine. On the other hand, if the fuel delivery pressure is below the limiting pressure $P_o$, any movement of the diaphragm into chamber E would have no effect on valve 114, since it normally abuts against stop member 166 in open position. Consequently, this apparatus provides standby protection for overriding the normal fuel control system when the increase in the fuel delivery rate exceeds the maximum permissible value.

Having shown and described the invention it will be understood that variations and modifications may be effected without departing from the scope of the novel concepts of this invention.

I claim as my invention:

1. In a fuel control system for a compressor turbine engine having an acceleration rate limits characteristic which varies as a function of engine speed, comprising conduit means, fuel delivery means delivering fuel through the conduit means to the engine at a pressure related to the engine speed, fuel flow control means in said conduit means and operatively connected to the fuel delivery means for controlling the flow of fuel to the engine by the fuel delivery means, pneumatic speed converting means mechanically connected to the engine and in fluid communication with a constant pressure air source for converting the engine speed to a first air pressure proportional to the engine speed, function generating means in fluid communication with the converting means and receiving air at said first pressure therefrom, said generating means being in fluid communication with ambient and with a constant air pressure source and producing a second air pressure which is a function of said first air pressure, said constant air pressure and ambient air pressure and which is also proportional to the acceleration rate limits characteristic of the engine, and pressure comparator means mechanically connected to the fuel flow control means and in fluid communication with the conduit means downstream of said control means for sensing the fuel flow pressure therein and also in fluid communication with the function generating means receiving air at said second pressure therefrom, said comparator means actuating said fuel flow control means when the fuel flow pressure is greater than said second air pressure to decrease fuel flow to the engine.

2. In a fuel control system for a compressor turbine engine having an acceleration rate limits characteristic which varies as a function of engine speed, comprising conduit means, fuel delivery means delivering fuel through the conduit means to the engine at a pressure related to the engine speed, fuel flow control means in said conduit means and operatively connected to the fuel delivery means for controlling the flow of fuel to the engine by the fuel delivery means, pneumatic speed converting means mechanically connected to the engine and in fluid communication with a constant pressure air source for converting the engine speed to a first air pressure proportional to the engine speed, function generating means in fluid communication with the converting means and receiving air at said first pressure therefrom, said generating means comprising a housing defining therewithin a plurality of chambers one of which communicates with said converting means, a second of said chambers being in communication with a constant air pressure source and also with ambient, said housing in said second chamber mounting valve means in control of the admission of the constant air pressure and discharge to ambient, a third of said chambers communicating with said second of said chambers and provided with a discharge port, the air at said first air pressure upon admission to said one chamber actuating said valve means to increase the pressure in the second of said chambers and producing a second air pressure therein discharged from said port which is a function of said first air pressure, said constant air pressure and ambient air pressure and which is also proportional to the acceleration rate limits characteristic of the engine, and pressure comparator means mechanically connected to the fuel flow control means and in fluid communication with the conduit means downstream of said control means for sensing the fuel flow pressure therein and also in fluid communication with the function generating means receiving air at said second pressure therefrom, said comparator means actuating said fuel flow control means when the fuel flow pressure is greater than said second air pressure to decrease fuel flow to the engine.

References Cited in the file of this patent

UNITED STATES PATENTS

| | | |
|---|---|---|
| 2,477,897 | Ray | Aug. 2, 1949 |
| 2,702,560 | Bobier | Feb. 22, 1955 |
| 2,846,846 | Mock | Aug. 12, 1958 |
| 2,851,855 | Gamble | Sept. 16, 1958 |